United States Patent Office 2,845,310
Patented July 29, 1958

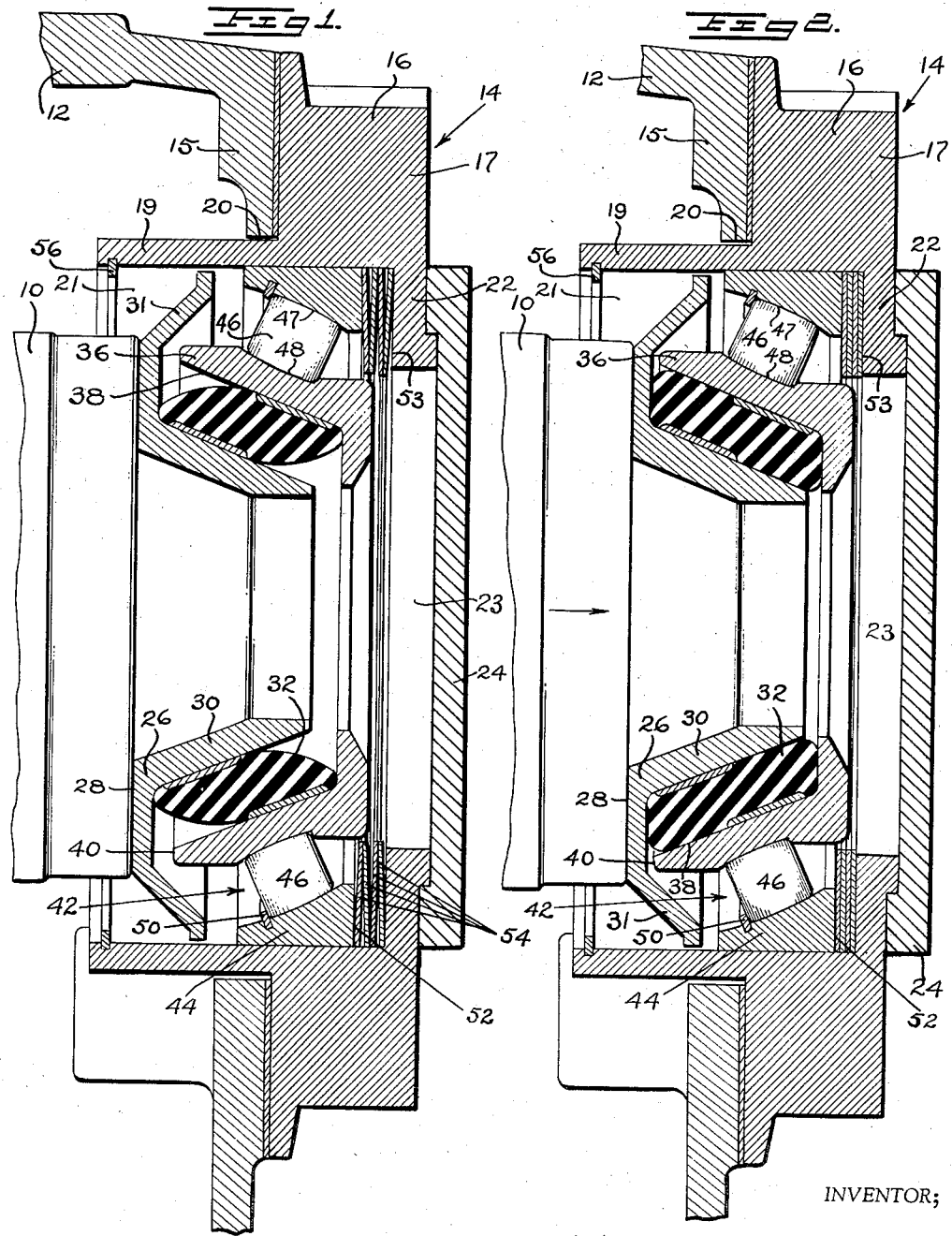

2,845,310

JOURNAL BOX

Walter A. Butkus, Kearny, N. J., assignor to General Motors Corporation, Detroit, Mich., a corporation of Delaware Application January 24, 1956, Serial No. 561,029

10 Claims. (Cl. 308—41)

This invention relates to a railway journal box and more particularly to an assembly adapted to absorb the axial thrust load from an axle member in such a box.

In a thrust mechanism utilizing a thrust bearing comprised of races and roller elements in conjunction with a rotating and axially shiftable axle, the endwise movement of the axle results in contact not being continuously maintained between the axle and the thrust bearing. This interrupted contact results in intermittent rotation of the bearing elements and sudden shock loads on the bearing while inoperative and usually produces brinnelling and spalling of the raceways as well as damage to the roller elements. The interrupted axle-bearing contact also tends to cause axial looseness between the bearing components resulting in another severe bearing wear condition. The life of an antifriction bearing is usually very short after damage has been inflicted on the raceways or on the rolling elements.

It is, therefore, a purpose of the present invention to provide means whereby a thrust bearing is axially biased into engagement with an axle to provide continuous roller rotation as well as to maintain contact between the bearing components.

In the subject journal box thrust assembly it is proposed to combine a thrust bearing with a resilient thrust absorbing member of the type shown in Brittain U. S. Patent 2,676,854. This combination has resulted in a very effective thrust absorbing mechanism. It has been found that such a resilient thrust absorbing member should be maintained under a preload or compressive stress to provide an initial thrust load on the bearing and insure satisfactory operation.

Accordingly, it is a further purpose of the invention to provide means for maintaining the resilient thrust member and the thrust bearing under a preload in the thrust assembly.

It is still another purpose of this invention to provide a thrust assembly comprising a thrust bearing member, a resilient thrust absorbing member, and common means for maintaining the thrust bearing components in contact with each other, as well as with the axle, and also for maintaining the resilient member in a preloaded condition.

It has been found important to reduce the axial displacement of a journal box thrust assembly particularly for railroad passenger car application. Passenger car journal box specifications usually require that the axial displacement, i. e. the distance from the end of the axle to the outside of the thrust assembly be but a fraction of that acceptable in freight car application. To illustrate the severity of the reduction of axial displacement, it has been specified that in passenger car application, the thrust assembly can only be ¼ of the axial length of that of a comparable freight car thrust assembly. Therefore, it is an object of the present invention to provide a longitudinally compact thrust assembly for cushioning the endwise movements of an axle which usually occur when a car negotiates curves or uneven portions of track.

More specifically, the present invention proposes to concentrically arrange the thrust assembly components in a way which eliminates the number of parts required thus facilitating an appreciable reduction in overall longitudinal displacement.

These and other objects will be apparent from a perusal of the detailed description which follows.

In the drawings:

Figure 1 discloses a preferred embodiment of the thrust absorbing assembly as mounted on a journal box.

Figure 2 discloses the assembly under an axial thrust load.

In the drawing, an axle 10 is shown disposed in a journal box 12. A thrust absorbing assembly 14 is demountably secured to an end wall 15 of the journal box 12 through a flange 16 held against the end wall and formed on an end cap 17.

In this thrust assembly, the end cap 17 includes a cylindrical sleeve portion 19 projecting inwardly through a bore 20 in the end wall 15 and having counterbore 21 at one end while partially closed at the other end by an inwardly extending flange 22 having a through bore 23 opening into the counterbore 21. An end cover 24, suitably secured to the flange 22 closes the outer end of the bore 23. An annular seat member 26 is disposed for axial movement within the cylindrical sleeve portion 19 and includes a flat end face 28 adapted to engage the end of axle 10 and a frusto-conical portion 30 projecting axially within the end cap 17. The inner end of the seat member 26 has an annular flange 31 which extends into closely spaced relation with the wall of the counterbore 21 to protect the thrust assembly and to prevent flow of too much lubricant from the journal box into the thrust assembly.

A frusto-conical resilient thrust member 32 supports the member 26 on the interior conical surface of projection 30. The resilient thrust member 32 constitutes no part of the present invention per se, and is described in detail in Brittain Patent 2,676,854. It will suffice for the purposes of the present invention to say that the member 32 comprises a frusto-conical ring of synthetic rubber or other suitable yieldable material that is inherently and deformably resilient and will not deteriorate in the presence of oil. Reinforcing sleeves bonded to the outer and inner walls of member 32 and spaced inwardly from its ends aid this resilient member 32 to undergo a shear deformation when compressed axially.

A thrust block 36 is disposed within the cylindrical sleeve 19 and includes a frusto-conical portion 38 corresponding to and axially and radially spaced from frusto-conical portion 30. The interior surface of the frusto-conical portion 38 seats against and supports the cushion member 32. The thrust block 36 terminates in a flat end wall 40 at the outer end of the frusto-conical portion 38.

A thrust bearing 42 is axially movable as a unit within the cylindrical sleeve 19 of the end cap 17 and includes an outer race ring 44 slidable in the counterbore 21, and rollers 46, and an inner ring which comprises the thrust block 36. The rollers 46 are illustrated as barrel-shaped and rollingly engage annular raceways 47 and 48. These raceways are preferably angularly disposed to each other and parti-spherical in contour. The axes of the rollers 46 are inclined and normally intersect along an outboard extension of the axis of axle 10. This provides an angular contact bearing adapted for both axial and radial loads and accommodating any conditions of misalignment of race rings to assure that the end face 28 on the seat member 26 will remain in flat engagement with the end of the axle 10. A snap ring 50 mounted within a groove in the outer race ring 44 in conjunction with an annular shoulder formed on the inner raceway 48 holds the parts of the thrust bearing 42 in unit-handling assembly.

The outer race ring 44 has a flat end face 52 axially spaced from a radial inner wall 53 on the end cap flange 22.

A stack of Belleville washers or other suitable spring means 54 is axially slidably disposed within the counterbore 21 and abuts at one end against the wall 53 and has its other end in abutting engagement with the flat end face 52 of the slidably mounted outer race ring 44 thus biasing the raceway 47 into engagement with rollers 46 and in turn biasing these rollers into engagement with the inner raceway 48. The diameter of the inner race ring 36 adjacent the washers 54 is less than that of the openings in the Belleville spring stack to permit relative movement between the block and springs or washers 54 without interference.

As already suggested, it is necessary to maintain the resilient thrust member 32 under a sufficient preload or compressive stress within the thrust assembly to assure rotation of the rollers 46 whenever there is rotation of the axle 10. However, in most instances, the means by which such members are preloaded has required further adjustment after the journal box has been in use for a prolonged period of time. By use of the resilient Belleville stack 54, a continuing preloaded condition may be maintained with respect to the resilient member 32 thereby overcoming the frequent bearing failures that have resulted from insufficient or improper preload.

Thus, Belleville washers or springs 54 exert an axial thrust on outer race ring 44 as well as on the resilient cushion 32. In this way the slidable thrust bearing 42 will readily follow the axial movements of the axle 10 and thus maintain itself in the condition for continuous roller rotation while concurrently maintaining cushion 32 under a preload.

The Belleville washer stack or springs 54 are considerably more resilient than the resilient cushion 32 and upon the imposition of an axial thrust load by the axle 10, these springs will be readily compressed before any appreciable deformation has taken place in the resilient cushion 32.

A snap ring 56 is removably located in an annular groove opening into the counterbore 21 near the end of the sleeve portion 19. This snap ring 56 may engage the peripheral portion of the flange 31 to hold the parts in unit-handling assembly with the end cap 17 when it is demounted from the journal box. However, when the end cap and its associated parts are secured to the box in operative positions, as shown, the snap ring 56 is spaced from the seal member 26 and has no function.

The operation of the thrust assembly 14 is briefly as follows: upon the endwise movement of axle 10 towards the thrust bearing 42, thrust is transmitted through the engaging seat member 26, resilient member 32, thrust block 36, rollers 46, outer ring 44, and Belleville springs 54 to the end cap 17. The endwise movement of the axle 10 quickly compresses the Belleville stack 54 effectually providing a solid axial connection from the thrust bearing 42 to the end cap 17. Further axial thrust by axle 10 is resiliently resisted by the cushion 32 which will progressively undergo a shear deformation as seen in Figure 2, to fill the space between the members 26 and 36, the extent of endwise axle movement being finally limited by abutting engagement of the end face 40 of the inner race ring against the seat member 26. Upon the release of axial thrust, the parts will return to their positions in Figure 1 and the springs 54 will provide the light axial thrust requisite to maintain cushion 32 under preload and bearing 42 in a continuous operating condition.

I claim:

1. A journal box having an axle mounted therein for rotational and axial movement, an end cap demountably secured to said journal box and including a cylindrical sleeve portion coaxially disposed with said axle, a seat member movable endwise in said sleeve portion and engageable with the end of said axle, a resilient cushion mounted on said seat member, a thrust bearing slidably mounted in the end cap and mounted on said cushion, and resilient means disposed within said end cap urging said bearing toward said axle.

2. A journal box having an axle mounted therein for rotational and axial movement, an end cap demountably secured to said journal box, a seat member movable endwise in the end cap and engageable with the end of said axle, a thrust bearing slidably mounted in the end cap, resilient means engaging the end cap and urging the bearing towards the axle, and a resilient cushion seated on the thrust bearing and supporting said seat member.

3. A journal box as defined in claim 1 in which said cushion, seat member and thrust bearing are substantially concentrically disposed.

4. A journal box having an axle mounted therein for rotation and endwise movement, an end cap demountably secured to said journal box, a seat member movable endwise in the end cap and engageable with the end of said axle, a thrust bearing slidable in the end cap, spring means between the thrust bearing and an end wall of said end cap, a resilient cushion seated against the seat member and against the thrust bearing, and means demountable in the end cap which secures the parts within the end cap in demountable unit-handling relation therewith.

5. A journal box having an axle mounted therein for rotation and endwise movement, an end cap demountably secured to said journal box and having a bore substantially coaxial of the axle, an annular seat member movable endwise in the bore and engageable with an end of the axle, an antifriction thrust bearing slidably mounted in said bore, spring means engageable with an end wall of said end cap and urging the thrust bearing towards the axle, and a resilient cushion supported by the thrust bearing and supporting the seat member in spaced relation to the end cap.

6. A journal box having an axle mounted therein for rotation and endwise movement, an end cap demountably secured to said journal box and having a bore extending towards the axle, an annular seat member axially movable in the bore and engageable with an end of the axle, a thrust bearing slidable in the bore, spring means between the bearing and a wall of the end cap and urging the bearing towards the end of the axle, a resilient cushion seated against the thrust bearing and said seat member, and a member demountably secured in the bore to hold the seat member, cushion, bearing and spring means in demountable unit-handling assembly with the end cap.

7. A journal box having an axle journalled therein for rotational and endwise movement, an end cap demountably secured to said journal box and including a cylindrical sleeve portion coaxially disposed to said axle, an annular seat member having a surface abutting the end of the axle, a frusto-conical projection on the seat member extending within the end cap, a thrust block having a frusto-conical projection corresponding to and spaced from the seat member projection, a frusto-conical cushion element intermediate and resiliently connecting said frusto-conical projections, a thrust bearing axially slidable within the end cap and including said thrust block, and a spring member intermediate said end cap and thrust bearing urging said bearing, block, cushion and seat toward said axle.

8. A journal box as defined in claim 7 in which said thrust bearing member includes an outer race ring slidingly engaging the cylindrical sleeve of the end cap, said outer race ring having an annular raceway, an inner raceway formed on said thrust block and roller elements engaging said raceways.

9. A journal box as defined in claim 7 in which said frusto-conical projections, said frusto-conical cushion element and said thrust bearing are substantially concentrically related.

10. A journal box having an axle mounted therein for rotational and endwise movement, an axle thrust assembly comprising an end cap demountably secured to the journal box, said end cap including a cylindrical bore open at one end and partially closed at the other by an inwardly extending annular flange, a cover secured to the flange, a seat member disposed within said sleeve and having an end surface abutting the axle, said member including a frusto-conical projection, a thrust block having a frusto-conical surface corresponding to and radially spaced from the seat member projection, a frusto-conical cushion element intermediate and resiliently connecting said frusto-conical projection and surface, a thrust bearing including an outer race ring slidable in said bore, the outer race ring having an annular raceway, an inner raceway formed on the thrust block, said rollers engaging the raceways, and a plurality of spring members seated between the annular flange of said end cap and said outer race ring, said frusto-conical projection, thrust block and outer race ring being in longitudinally overlapping relation.

References Cited in the file of this patent

UNITED STATES PATENTS

| | | |
|---|---|---|
| 2,676,854 | Brittain | Apr. 27, 1954 |
| 2,697,015 | Noe | Dec. 14, 1954 |